(12) United States Patent
Mainini

(10) Patent No.: US 8,505,494 B2
(45) Date of Patent: Aug. 13, 2013

(54) METHOD AND DEVICE FOR DESENSITIZING AN ANIMAL TO AN ANXIETY INDUCING SOUND

(75) Inventor: Christopher E. Mainini, Knoxville, TN (US)

(73) Assignee: Radio System Corporation, Knoxville, TN (US)

(*) Notice: Subject to any disclaimer, the term of this patent is extended or adjusted under 35 U.S.C. 154(b) by 239 days.

(21) Appl. No.: 12/917,221

(22) Filed: Nov. 1, 2010

(65) Prior Publication Data
US 2012/0103276 A1    May 3, 2012

(51) Int. Cl.
*A01K 37/00*    (2006.01)

(52) U.S. Cl.
USPC ............ 119/712; 119/719; 119/905; 119/908

(58) Field of Classification Search
USPC ................. 119/712, 719, 905, 718, 908, 720, 119/702
See application file for complete search history.

(56) References Cited

U.S. PATENT DOCUMENTS

| | | | | |
|---|---|---|---|---|
| 3,099,248 A * | 7/1963 | Giles et al. | ..................... | 119/712 |
| 5,061,918 A * | 10/1991 | Hunter | ....................... | 340/573.2 |
| 5,239,943 A * | 8/1993 | Kim | ........................... | 119/51.12 |
| 5,749,324 A * | 5/1998 | Moore | ........................... | 119/719 |
| 6,273,027 B1 * | 8/2001 | Watson et al. | ................. | 119/712 |
| 6,651,592 B2 * | 11/2003 | Maddox et al. | ............... | 119/720 |
| 6,694,916 B1 * | 2/2004 | Rucker et al. | ............... | 119/51.01 |
| 7,861,676 B2 * | 1/2011 | Kates | ........................... | 119/720 |
| 2010/0275851 A1 * | 11/2010 | Yin | ............................. | 119/51.02 |
| 2011/0017150 A1 * | 1/2011 | Caputo et al. | ................. | 119/719 |

OTHER PUBLICATIONS

How to Desensitize a Scared Dog, by Linda Cole, Responsible Pet Ownership Blog, Oct. 29, 2012 [retrieved from internet Oct. 15, 2012].*

* cited by examiner

*Primary Examiner* — Andrea Valenti
(74) *Attorney, Agent, or Firm* — Pitts & Lake, P.C.

(57) ABSTRACT

Described is a counter-conditioning device and method for desensitizing an animal to an anxiety inducing sound and for minimizing a user's required involvement in such desensitization. The device and method are for automatically conditioning an animal that exhibits anxiety in response to the occurrence of a particular sound such that the animal learns to anticipate a treat upon the occurrence of the sound.

7 Claims, 2 Drawing Sheets

METHOD AND DEVICE FOR DESENSITIZING AN ANIMAL TO AN ANXIETY INDUCING SOUND

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention pertains to a method and device for desensitizing an animal to a particular sound such that anxiety caused by the sound is reduced.

2. Description of the Related Art

Approximately 20-50% of pets develop an anxiety or fear associated with a particular sound such as thunder, gunfire, car backfire, fireworks, and various other sudden and intense sounds. This anxiety causes the pet to pant, pace, tremble, hide, bark, and/or become aggressive and/or destructive. When such an anxiety goes untreated, the pet is likely to develop additional anxieties, creating an unhappy and unhealthy pet.

Currently, anxiety associated with a particular sound is treated by a strong sedative prescribed by a veterinarian. Drawbacks to sedatives include cost, side effects, incapacitation of the pet, and injury associated therewith. Additionally, although sedatives can be administered to a pet prior to, for example, an impending storm, many anxiety-causing sounds are unpredictable and sudden such that sedating a pet prior to the onset of anxiety is not possible.

Conventional methods for desensitizing a pet to a particular sound require a pet owner to conduct therapy sessions multiple times a day on an ongoing basis. One such conventional method is detailed at www.scarednomore.com. Consequently, a method and device for desensitizing a pet to a particular sound and for minimizing the active involvement of a pet owner in such desensitization is desired.

BRIEF SUMMARY OF THE INVENTION

In accordance with the various features of the present invention there is provided a counter-conditioning device and method for desensitizing an animal to an anxiety inducing sound and for minimizing a user's active involvement in such desensitization. First, the device automatically conditions the animal to associate the occurrence of a conditioning sound with the dispensation of a conditioning element, such as a pet treat. More specifically, the device delivers the conditioning sound and subsequently dispenses a conditioning element. The device detects whether the animal takes the conditioning element to determine whether the animal associates the conditioning sound with the dispensation of the conditioning element. When the animal makes the association, the device automatically conditions the animal to associate the occurrence of the anxiety inducing sound with the occurrence of the conditioning sound and the dispensation of a conditioning element. More specifically, the device delivers the anxiety inducing sound, followed by the conditioning sound, and ultimately dispenses a conditioning element. The device again detects whether the animal accesses the conditioning element to determine whether the animal associates the anxiety inducing sound with the conditioning sound and the dispensation of a conditioning element. When the animal makes this association, the device automatically conditions the animal to associate the occurrence of the anxiety inducing sound of increased volume with the dispensation of a conditioning element. More specifically, the device increases the volume of the anxiety inducing sound and delivers the anxiety inducing sound of increase volume, followed by the dispensation of a conditioning element. The device again detects whether the animal accesses the conditioning element to determine whether the animal associates the anxiety inducing sound with the dispensation of a conditioning element. The device continues to increase the volume of the anxiety inducing sound until it reaches that of the actual anxiety inducing sound. However, in the event the animal does not continue to take the treats as the volume of the anxiety inducing sound increases, the device decreases the volume of the sound until the animal associates the anxiety inducing sound of increased volume with the dispensation of a conditioning element.

In view of the above discussion, the method for counter-conditioning the animal is automated such that the device automatically conditions the animal with effectively no training conducted by the user. Accordingly, the device and method minimize the user's active involvement in the training such that the animal is conditioned with limited time invested by the user.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
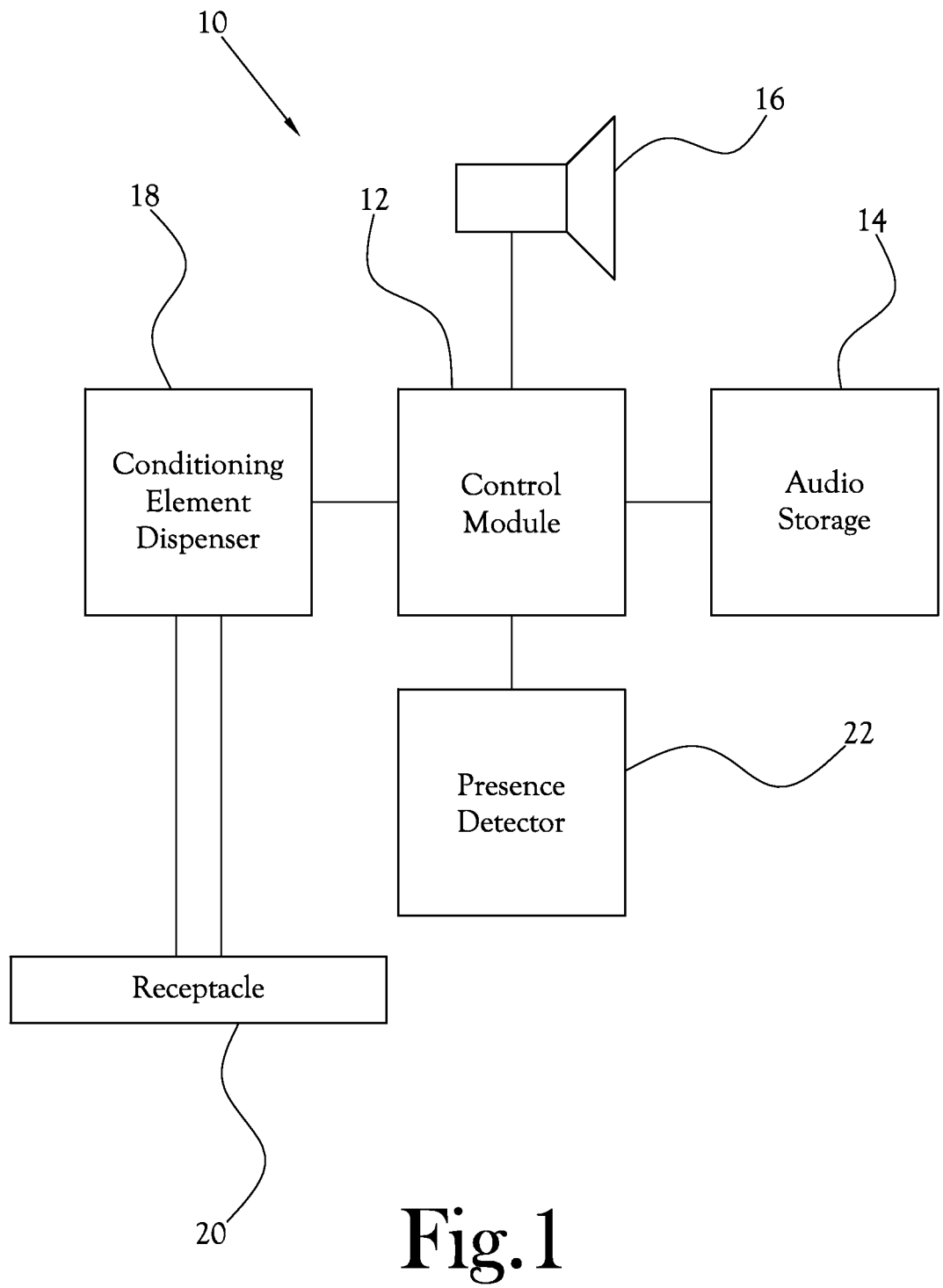
FIG. 1 is a block diagram of one embodiment of the counter-conditioning device in accordance with the various features of the present invention.

The present invention provides a counter-conditioning device and method for desensitizing an animal to an anxiety inducing sound and for minimizing a user's active involvement in such desensitization. The device and method are for conditioning an animal that exhibits anxiety in response to the occurrence of a particular sound such that the animal learns to anticipate a treat upon the occurrence of the sound. The device conducts this conditioning such that a user is not actively involved in the training process to the extent that the user is not required to invest extensive amounts of time to the training. A block diagram of one embodiment of the counter-conditioning device constructed in accordance with the various features of the present invention is illustrated generally at 10 in FIG. 1.

The counter-conditioning device 10 includes a control module 12, an audio storage 14, a speaker 16, a conditioning element dispenser 18, a receptacle 20, and a presence detector 22. The control module 12 is in electrical communication with the audio storage 14, the speaker 16, the conditioning element dispenser 18, and the presence detector 22. The conditioning element dispenser 18 dispenses a conditioning element when activated by the control module 12. A conditioning element is anything pleasant or pleasing to the animal, such as, for example, a consumable treat. The receptacle 20 is positioned with respect to the dispenser 18 such that the receptacle 20 receives a conditioning element dispensed by the dispenser 18. The receptacle 20 presents the conditioning element such that it is accessible by the animal.

The presence detector 22 detects the presence of the animal at the receptacle 20. Accordingly, the presence detector 22 is adapted to indicate when the animal accesses a conditioning element from the receptacle 20. For example, when the control module 12 activates the conditioning element dispenser 18 to dispense a conditioning element and, subsequently, the presence detector 22 detects the presence of the animal at the receptacle 20, the control module 12 determines that the animal accessed the conditioning element. The presence detector 22 includes any device capable of detecting the animal's presence at the receptacle 20. Examples of the presence detector 22 include, but are not limited to, a motion detector, a pressure switch disposed proximate the receptacle 20, and a pressure switch in mechanical communication with the receptacle 20.

The audio storage 14 maintains audio recordings or audio files of a conditioning sound and an anxiety inducing sound. The conditioning sound is a neutral or comforting sound for the animal that the device 10 associates with the dispensation of a conditioning element. The conditioning sound can be a designated tone or an audio recording of, for example, a human voice. The anxiety inducing sound is a recording or generation of the actual sound that induces fear and anxiety in the animal. The anxiety inducing sound may include, for example, thunder, gunfire, and fireworks. It should be noted that the conditioning sound and the anxiety inducing sound can be sounds other than those discussed above without departing from the scope or spirit of the present invention. The control module 12 accesses the audio storage 14 and activates the speaker 16 to deliver the conditioning sound and the anxiety inducing sound, respectively, in accordance with the subsequently discussed counter conditioning method.

Figure 2:
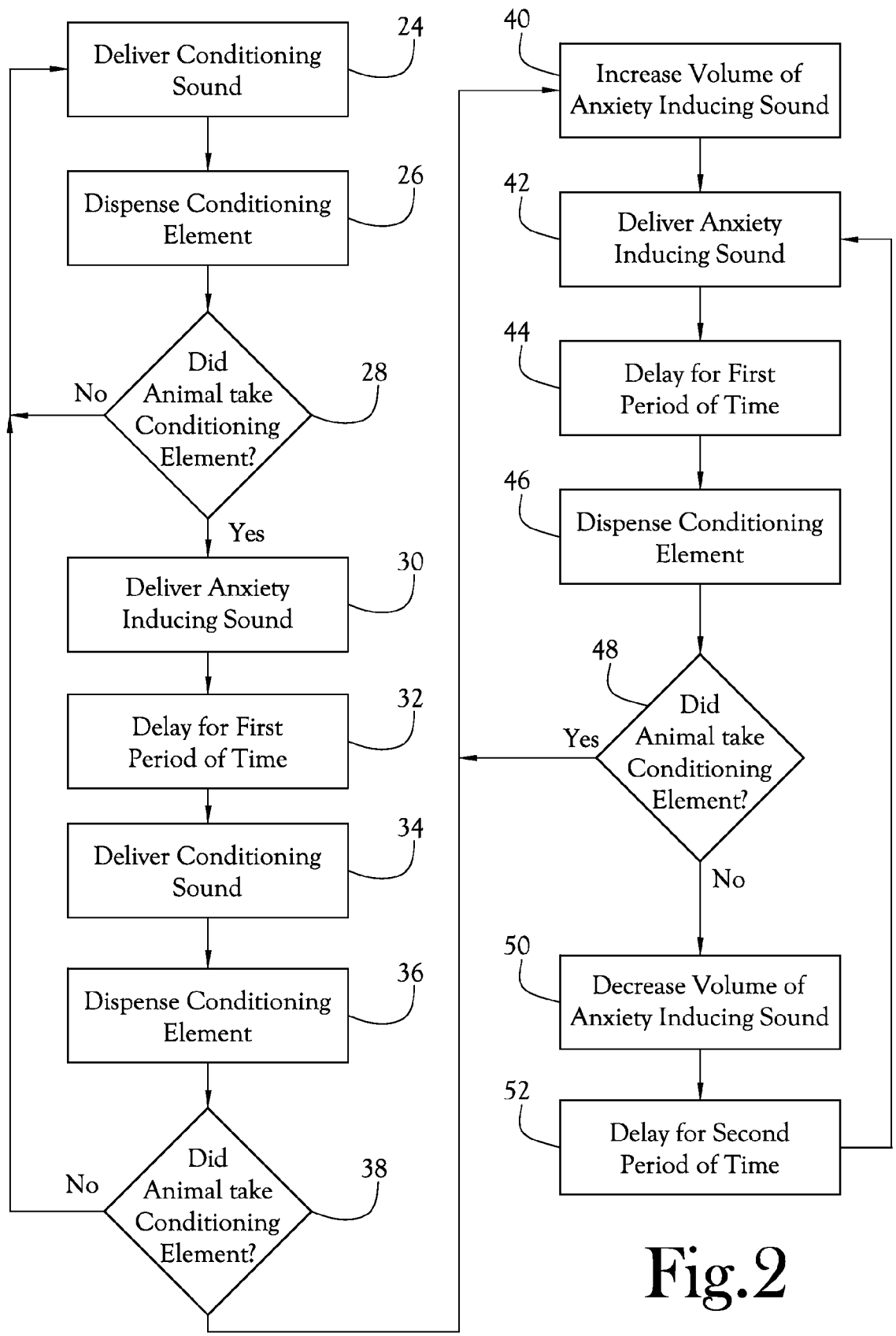
FIG. 2 is a flow diagram illustrating one embodiment of the operation of the counter-conditioning device.

FIG. 2 is a flow diagram illustrating the operation of and method implemented by the counter-conditioning device 10. After the device 10 is activated, the control module 12 accesses the audio storage 14 and activates the speaker 16 to deliver the conditioning sound, as illustrated at 24. After the conditioning sound is delivered, the control module 12 activates the conditioning element dispenser 18 to dispense a conditioning element that is received by the receptacle 20, as illustrated at 26. The control module 12 then considers the presence detector 22 to determine whether the animal takes the conditioning element from the receptacle 20, as illustrated at 28. When the presence detector 22 does not indicate that the animal has taken the conditioning element, it is determined that the animal does not yet associate the conditioning sound with the dispensation of the conditioning element. As a result, the control module 12 again activates the speaker 16 to deliver the conditioning sound, as illustrated at 24. However, when the presence detector 22 indicates that the animal has taken the conditioning element, it is determined that the animal does associate the conditioning sound with the dispensation of the conditioning element.

When it has been determined that the animal associates the conditioning sound with the dispensation of a conditioning element, the control module 12 accesses the audio storage 14 and activates the speaker 16 to deliver the anxiety inducing sound, as illustrated at 30. Next, the control module 12 delays for a first predetermined period of time, as illustrated at 32, and then activates the speaker 16 to deliver the conditioning sound, as illustrated at 34. In accordance with the above discussion, after the conditioning sound is delivered, the control module 12 activates the dispenser 18 to dispense a conditioning element that is received by the receptacle 20, as illustrated at 36. The delay for the first predetermined period of time conditions the animal to associate the occurrence of the anxiety inducing sound with a small delay, followed by the occurrence of the conditioning tone and ultimately the dispensation of a conditioning element. This delay prevents the animal from becoming anxious when the conditioning sound and/or a conditioning element does not immediately follow the occurrence of the anxiety inducing sound, especially, after the desensitization training is complete and the device 10 is not currently being used.

After the dispenser 18 dispenses a conditioning element at 36, the control module 12 considers the presence detector 22 to determine whether the animal takes the conditioning element from the receptacle 20, as illustrated at 38. When the presence detector 22 does not indicate that the animal has taken the conditioning element, it is determined that the animal does not yet associate the anxiety inducing sound with the conditioning tone and the dispensation of a conditioning element. As a result, the control module 12 again activates the speaker 16 to deliver the conditioning sound, as illustrated at 24. However, when the presence detector 22 indicates that the animal has taken the conditioning element, it is determined that the animal does associate the anxiety inducing sound with the conditioning sound and the dispensation of a conditioning element.

When it has been determined that the animal associates the anxiety inducing sound with the conditioning sound and the dispensation of a conditioning element, the control module 12 increases the volume of the anxiety inducing sound, as illustrated at 40, and activates the speaker 16 to deliver the anxiety inducing sound of increased volume, as illustrated at 42. The control module 12 increases the volume of the anxiety inducing sound to condition the animal to the actual volume of the actual anxiety inducing sound. After the anxiety inducing sound of increased volume is delivered, the control module 12 delays for the first predetermined period of time, as illustrated at 44, and then activates the dispenser 18 to dispense a conditioning element that is received by the receptacle 20, as illustrated at 46. The control module 12 then considers the presence detector 22 to determine whether the animal takes the conditioning element from the receptacle 20, as illustrated at 48. When the presence detector 22 indicates that the animal has not taken the conditioning element, it is determined that the animal does not yet fully associate the anxiety inducing sound, or at least the anxiety inducing sound of increased volume, with the dispensation of the conditioning element and, as a result, decreases the volume of the anxiety inducing sound, as illustrated at 50. Next, the control module 12 delays for a second predetermined period of time, as illustrated at 52. The second predetermined period of time is more extensive than the first. The second period of time effectively ends the training session and provides the animal with a break from the anxiety inducing sound such that the counter conditioning does not become counter productive and cause the animal unnecessary anxiety. However, considering the animal's progress in associating the anxiety inducing sound with the dispensation of a conditioning element exhibited at actions 30-38, after the second predetermined period of time has expired, the control module 12 again activates the speaker 16 to deliver the anxiety inducing sound of decreased volume, as illustrated at 42.

However, when the presence detector 22 indicates that the animal has taken the conditioning element after the anxiety inducing sound of increased volume is delivered, it is determined that the animal associates the anxiety inducing sound of increased volume with the dispensation of the conditioning element. As a result, the control module 12 further increases the volume of the anxiety inducing sound, as illustrated at 40, and delivers the anxiety inducing sound of further increased volume and, accordingly, dispenses a conditioning element, as illustrated at actions 42-46. The control module 12 continues to execute the loop of actions at 42-46 until the delivered anxiety inducing sound reaches a volume desired by the user, which is typically substantially that of the actual anxiety inducing sound.

Considering the above discussion, actions 24-28 condition the animal to associate the occurrence of the conditioning sound with the dispensation of a conditioning element, actions 30-38 condition the animal to associate the occurrence of the anxiety inducing sound with both the occurrence of the conditioning sound and the dispensation of a conditioning element, and actions 40-48 condition the animal to associate the anxiety inducing sound of increased volume with the dispensation of a conditioning element. Stated differently, the device 10 first associates the conditioning tone and the conditioning element, then associates the anxiety inducing sound with both the conditioning tone and the conditioning element, then associates the anxiety inducing sound with the conditioning element, and ultimately associates the anxiety inducing sound of actual volume with the conditioning element. Accordingly, the device 10 counter-conditions the animal to respond to the occurrence of the anxiety inducing sound with anticipation of a treat instead of anxiety, thus desensitizing the animal to the anxiety inducing sound. Also, considering the above discussion, the device 10 accomplishes the desensitization of the animal with minimal active participation by the user.

From the foregoing description, those skilled in the art will recognize that a counter-conditioning device and method for desensitizing an animal to an anxiety inducing sound offering advantages over the prior art has been provided. More specifically, the device and method are for conditioning an animal that exhibits anxiety in response to the occurrence of a particular sound such that the animal learns to anticipate a treat upon the occurrence of the sound. The device conducts this conditioning such that a user is not actively involved in the training process to the extent that the user is not required to invest extensive amounts of time to the training.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A method of desensitizing an animal to an anxiety inducing sound, the method comprising:
   providing an audio storage to store a conditioning sound and the anxiety inducing sound;
   providing a speaker to deliver the conditioning sound and the anxiety inducing sound;
   providing a conditioning element dispenser to dispense a conditioning element;
   providing a presence detector to detect the presence of the animal at a dispensed conditioning element; and
   providing a control module in electrical communication with and activates operation of said audio storage, said speaker, said conditioning element dispenser, and said presence detector;
   delivering the conditioning sound from said speaker and subsequently dispensing a first conditioning element from said conditioning element dispenser; and when said presence detector detects the presence of the animal at the first conditioning element, delivering the anxiety inducing sound from said speaker followed by delivering the conditioning sound from said speaker and dispensing a second conditioning element from said conditioning element dispenser.

2. The counter-conditioning method of claim 1 wherein said control module increases the volume of the anxiety inducing sound when said presence detector detects the presence of the animal at the second conditioning element.

3. The counter-conditioning method of claim 2 wherein said control module activates said speaker to deliver the anxiety inducing sound of increased volume and thereafter activates said conditioning element dispenser to dispense a third conditioning element.

4. The counter-conditioning method of claim 3 wherein said control module decreases the volume of the anxiety inducing sound when said when said presence detector does not detect the presence of the animal at the third conditioning element.

5. The counter-conditioning method of claim 4 wherein said control module ends a training session when said control module decreases the volume of the anxiety inducing sound.

6. The counter-conditioning method of claim 1 further comprising providing a receptacle disposed with respect to said conditioning element dispenser such that said receptacle receives dispensed conditioning elements.

7. The counter-conditioning method of claim 6 wherein said presence detector detects the presence of the animal at the dispensed conditioning element by detecting the presence of the animal at said receptacle.

\* \* \* \* \*